United States Patent [19]

Gürke et al.

[11] Patent Number: 4,989,148
[45] Date of Patent: Jan. 29, 1991

[54] APPARATUS FOR THE COMPUTER-ASSISTED CONTROL OF VIBRATION DAMPERS OF A VEHICULAR SUSPENSION SYSTEM AS A FUNCTION OF THE ROADWAY

[75] Inventors: Reinhard Gürke, Windeck-Halscheid; Berthold Altwicker, Windeck-Dattenfeld, both of Fed. Rep. of Germany

[73] Assignee: Boge AG, Eitorf, Fed. Rep. of Germany

[21] Appl. No.: 330,334

[22] Filed: Mar. 29, 1989

[30] Foreign Application Priority Data

Mar. 29, 1988 [DE] Fed. Rep. of Germany ....... 3810638

[51] Int. Cl.⁵ .............................................. B60G 17/00
[52] U.S. Cl. ................................ 364/424.05; 280/707
[58] Field of Search .................... 364/424.05; 280/707, 280/840, 708, DIG. 1

[56] References Cited

U.S. PATENT DOCUMENTS

| 4,664,409 | 5/1987 | Nakashima et al. | 280/707 |
| 4,669,749 | 6/1987 | Tanaka et al. | 280/707 |
| 4,765,648 | 8/1988 | Mander et al. | 280/707 |
| 4,827,416 | 5/1989 | Kawagoe et al. | 364/424.05 |
| 4,853,860 | 8/1989 | Achenbach | 280/707 |
| 4,865,347 | 9/1989 | Fukushima et al. | 280/707 |
| 4,869,528 | 9/1989 | Buma et al. | 280/707 |
| 4,872,701 | 10/1989 | Akatsu et al. | 280/707 |

Primary Examiner—Gary Chin
Attorney, Agent, or Firm—Nils H. Ljungman & Associates

[57] ABSTRACT

Apparatus for the computer-assisted control, as a function of the roadway, of vibration dampers of a vehicle suspension system. The control uses the accelerations of the vehicle body and the vehicle wheels to dynamically adjust the damping force of the vibration dampers, whereby as little energy as possible is transmitted to the vehicle body the wheel axle. The damping force should be very low when the body and the axle move in the same direction, and when the amount of the velocity of the wheel axle is greater than the amount of the velocity of the vehicle body.

15 Claims, 3 Drawing Sheets

APPARATUS FOR THE COMPUTER-ASSISTED CONTROL OF VIBRATION DAMPERS OF A VEHICULAR SUSPENSION SYSTEM AS A FUNCTION OF THE ROADWAY

BACKGROUND OF THE INVENTION

1. Field of the Invention

The present invention relates to an apparatus for the computer-assisted control of vibration dampers, as a function of the roadway, of a vehicle suspension system, with sensors attached to the vehicle and/or vibration dampers, which emit electrical signals which characterize the unevenness of the roadway, with an evaluation circuit (e.g., a computer) which receives the sensor signals and from them produces the actuator signals for the vibration dampers, and with vibration dampers which have a wide spread of the family of characteristics between a very low and a very high damping force.

2. Description of the Prior Art

In devices known in the prior art (e.g., Published European Patent Application No. EP-A 0,151,421) for the automatic control or regulation of vibration dampers, the adjustment of the damping force of the vibration dampers takes place almost statically, i.e. by evaluation of an effective value or when a critical value is passed, resulting in a switching from a first damping force characteristic to a second damping force characteristic. An effective value regulation always requires a certain observation time, and such a critical value regulation system does not provide continuous adjustment.

The prior art also includes devices for the dynamic adjustment of the damping force of the vibration damper (e.g. German Laid Open Patent Application No. 34 26 014). No concrete details appear to be disclosed for the control of this apparatus.

OBJECT OF THE INVENTION

One object of the present invention is the provision of an improved apparatus for the computer-assisted control, as a function of the roadway, of vibration dampers of a vehicle suspension system, such that passenger comfort is increased, and such that the safety of the vehicle maintained, by continuously adjusting or regulating the damping force of the vibration damper between an upper damping force characteristic and a lower damping force characteristic to defined intermediate values.

SUMMARY OF THE INVENTION

This object is achieved by the invention in that the evaluation circuit transforms sensor signals representative of the acceleration of the vehicle body and the vehicle wheel $b_{body}$ and $b_{wheel}$ into signals and transmits them to a circuit receiving the absolute value generation of the car body acceleration and the absolute value generation of the car wheel acceleration, whereby the summing point forms, from the current $I_1$ of the absolute value generations of the car body acceleration and the car wheel acceleration, the current $I_2$ of an absolute value generation of the car wheel acceleration, and a constant current $I_0$, an activating signal for a proportional valve and/or an "n"-number of digital values of the vibration damper, such that the lowest damping force characteristic is engaged when the velocity of the wheel $V_{wheel}$ is greater than the velocity of the car body $V_{body}$ and the direction of the unit vector $E_{wheel}$ of the wheel is the same as the direction of the unit vector $E_{body}$ of the car body.

An advantage of this configuration is that the status of the vehicle is measured at each point in time. From the sensor values of the vehicle body acceleration and the vehicle wheel acceleration, a control current is continuously - i.e. at each point in time-determined via appropriate amplifiers and logic circuits for a proportional valve or for an appropriate number of digital valves. According to the invention, the optimal damping force for the vehicle can be set dynamically and continuously. The setting can be made simultaneously on each wheel, for each axle, or for all the vehicle wheels simultaneously. The performance data characteristic of the valve can be both progressive and degressive, and can be adapted for optimal comfort of the vehicle by means of appropriate pre-amplifiers, equalizers and control and regulation measures.

Another advantage is that the safety of the vehicle is determined, among other things, by the dynamic wheel load fluctuations. Severe wheel accelerations, caused by the roadway, also increase the wheel load fluctuations, for which reason a control current is calculated, which continuously increases the damping force of the vibration damper with increasing wheel acceleration.

Another essential characteristic of the invention is that the proportional valve exhibits a proportional behavior between a high damping force characteristic at a low current and a low damping force characteristic at a high current.

An advantage here is that the damping force characteristics need not be linear. The damping force constant $K_A$ can be calculated as follows for any desired point in the family of characteristics:

$$K_A = K_S - (K_S - K_K) \times K_1 \times I$$

where $K_A$ = damping force constant
$K_S$ = Constant of hardest damping force characteristic = $K_{Sport}$
$K_K$ = Constant of softest damping force characteristic = $K_{Comfort}$
$K_I$ = Proportional coefficient of the valve
$I$ = Control current It can be noted that the damping force constant of the vehicle body is proportional to the control current, the amplitude of which can be limited to a desired range by a limiter. The control action of the adjustment valve is described in a proportional element with a delay, whereby the temporal action of the vibration damper can be taken into consideration in another proportional element with a delay.

In another configuration of the invention, the sensor signals $b_{body}$ and $b_{wheel}$, after a digitization in an A/D converter, are then integrated into an integral in a computer circuit, and the mathematical sign is evaluated in a vectorizer, and transmitted to the sign comparator, whereby in the absolute value generator, the current amount of the velocity is calculated, and compared in the absolute value comparator, so that when the unit vectors have the same sign in the sign comparator, and there is a true comparison of the velocities in the absolute value comparator, the output signals of the sign comparator and of the absolute value comparator are logical "high", and produce an output signal in the NAND function to activate the analog circuit.

One general aspect of the invention resides broadly in a suspension system for a vehicle, the vehicle including a vehicle body and a vehicle wheel, the suspension system comprising: adjustable vibrational damping device for applying a vibrational damping action between the vehicle body and the vehicle wheel and for varying at least one characteristic of the applied vibrational damping action in response to a vibrational damping control signal; vehicle body accelerometer device for sensing an acceleration representative of the vehicle body and for generating at least one signal representative thereof; vehicle wheel accelerometer device for sensing an acceleration representative of the vehicle wheel and for generating at least one signal representative thereof; and signal processing device for processing the at least one signal representative of the vehicle body acceleration and the at least one signal representative of the vehicle wheel acceleration and for generating therefrom the vibrational damping control signal.

Another general aspect of the invention resides broadly in a control circuitry for controlling an adjustable vibration damper installed in a vehicle, the adjustable vibration damper being for reducing the transmission of vibrations between the body of a vehicle and a wheel of the vehicle, the adjustable vibration damper comprising apparatus for varying at least one characteristic of a vibrational damping action applied between the vehicle body and the vehicle wheel by the adjustable vibration damper in response to a damping control signal generated by the control circuitry, and the vehicle comprising first acceleration detection device for detecting the acceleration of the vehicle body and for generating a vehicle body acceleration signal representative thereof, and second acceleration of the vehicle wheel and for generating a vehicle wheel acceleration signal representative thereof, the control circuitry comprising: input apparatus for accepting the vehicle body acceleration signal and the vehicle wheel acceleration signal; signal processing device for processing the vehicle body acceleration signal and the vehicle wheel acceleration signal to generate the damping control signal; and output apparatus for supplying the generated damping control signal to the adjustable vibration damper.

BRIEF DESCRIPTION OF THE DRAWINGS

Preferred embodiments are schematically illustrated in the accompanying drawings.

DESCRIPTION OF THE PREFERRED EMBODIMENTS

Figure 1:
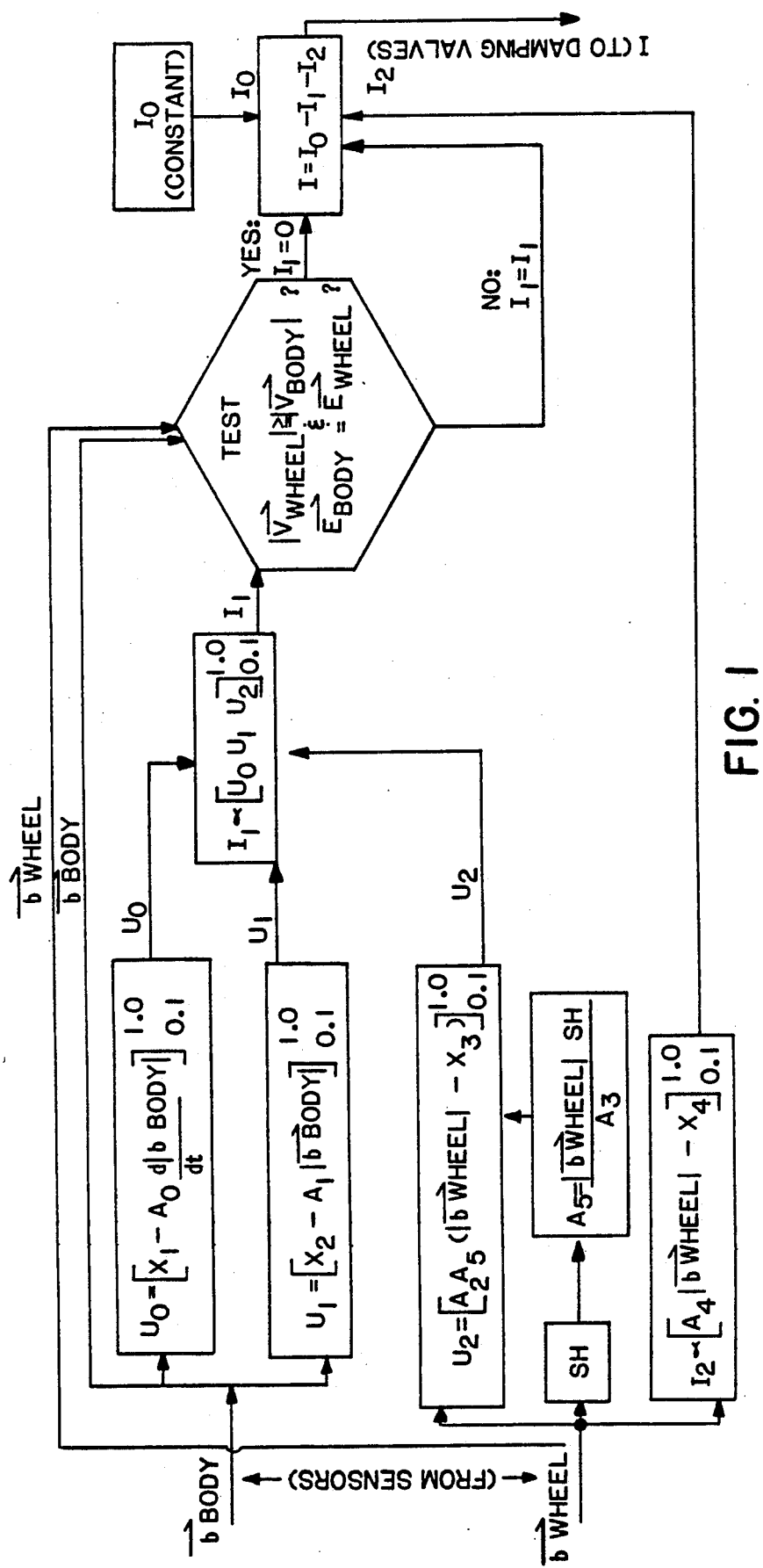
FIG. 1 is a schematic (or algorithmic) representation of signal processing circuitry to the invention.

Referring first to FIG. 1, in the present invention, signals indicative of the acceleration of the vehicle body $b_{body}$ and the acceleration of the vehicle $b_{wheel}$ are utilized to derive therefrom signals indicative of damping force characteristics which are used to adjust vibration dampers included in a suspension system and capable of exerting a variable damping force between the wheels and the body of a vehicle, to thereby substantially reduce the road shock transmitted to the body through the wheels.

Preferably, the sensor signals $b_{body}$ and $b_{wheel}$ are vector signals, in the sense that they contain information indicative of not only the magnitude of acceleration of the respective vehicle part, but also the direction of such acceleration. For example, a positive signal could be used to indicate a vertically upward direction of acceleration, while a negative signal could be used to indicate a vertically downward direction of acceleration. Signals $b_{body}$ and $b_{wheel}$ might, for example, be generated by accelerometers, which are well known in the art and are described, for example, in U.S. Pat. No. 3,731,542, issued to Forsberg on May 8, 1973 and entitled "Optical Accelerometer" and U.S. Pat. No. 4,104,921, issued Aug. 8, 1978 to Nissl and entitled "Piezo Electric Acceleration Transducer", both of these patents being hereby expressly incorporated by reference, with the same effect as if they were set forth in their entirety herein. An additional apparatus relating to variable vibration damping is disclosed in U.S. Pat. No. 4,638,670, issued on Jan. 27, 1987 to Moser and entitled "Apparatus for the Determination of the Distance Travelled by a Piston in a Cylinder", which is also hereby expressly incorporated by reference, with the same effect as if the entire contents thereof were fully set forth herein.

It will be seen that, within the accompanying drawings, an arrow (i.e., "→") is sometimes employed to indicate a vector signal, i.e., a signal having both a magnitude and direction. Within the written portion of the specification, the use of a vector arrow has not been employed. However, the signals b, V and E should be understood to be vector signals, the magnitudes of these signals being indicated through the use of the absolute value symbol, e.g., "$|b_{body}|$."

As shown schematically in FIG. 1, the signal $b_{body}$, which is indicative of both the magnitude and the direction of acceleration of the vehicle body, is used to derive two intermediate signals $U_0$ and $U_1$, according to the transformations (e.g., formulas) 1) and 2) set forth below. It will be appreciated by those of ordinary skill in the art that the carrying out of these signal processing steps (or formulas) may be accomplished by various equivalent means, such as, for example, through the use of a microprocessor, a digital filter or the like, in which case all of the signals discussed herein could be converted between analog and digital form through the use of analog to digital (A/D) and digital to analog (D/A) converters.

$$U_0 = \left[ X_1 - A_0 \frac{d|b_{body}|}{dt} \right]_{0.1}^{1.0} \quad (1)$$

$$U_1 = [X_2 - A_1 |b_{body}\uparrow|]_{0.1}^{1.0} \quad (2)$$

wherein $|b_{body}|$ equals the absolute value or (magnitude) of the acceleration of the vehicle body, $$\frac{d|b_{body}|}{dt}$$

equals the first derivative of the absolute value of the vehicle body acceleration with respect to time, and $A_0$, $A_1$, $X_1$ and $X_2$ are appropriately chosen constants based upon the particular vehicle characteristics (size, weight, etc.), empirical testing, expected road conditions and the like.

Another intermediate signal $U_2$ and an intermediate current $I_2$ are determined using the absolute value of the wheel acceleration $b_{wheel}$ according to the following signal processing transformations (3) and (4) as follows:

$$U_2 = [A_2 A_5 (|b_{wheel}| - X_3)]_{0.1}^{1.0} \quad (3)$$

$$I_2 \alpha [A_4 |b_{wheel}| - X_4]_{0.1}^{1.0} \quad (4)$$

wherein $A_2$, $A_4$, $A_5$, $X_3$ and $X_4$ are once again appropriately determined constants.

The coefficient $A_5$ is determined according to the following formulation (5):

$$A_5 = \frac{|b_{wheel}| SH}{A_3} \quad (5)$$

wherein the absolute value of $b_{wheel\ SH}$ is the absolute value of the wheel acceleration as determined by a sample and hold circuit SH and $A_3$ is once again an appropriately determined substantially constant value.

Preferably, according to the well known sampling theorem, the sample and hold circuit SH is operated at a sampling frequency which is at least equal to or greater than twice the frequency of vibrations which design considerations determine should be taken into account, most preferably, any known or expected resonance frequencies of the wheels. Additionally, the sample and hold circuit SH may include memory and comparator circuitry for determining and maintaining in memory the maximum wheel acceleration determined over an appropriate period of time.

Another intermediate current or signal $I_1$ is determined or produced in a proportional relationship to the product of the three intermediate signals $U_0$, $U_1$ and $U_2$ as follows:

$$I_1 \alpha [U_0 U_1 U_2]_{0.1}^{1.0} \quad (6)$$

In the above formulas (or transformations) 1–4 and 6, the intermediate signals $U_0$, $U_1$, $U_2$, $I_1$ and $I_2$ are all subjected to a limiting process such that their values, in a preferred embodiment, are limited to between about 0.1 and about 1.0. Of course, other appropriate limits might be utilized, depending upon the limits of adjustment of the particular vibration damping apparatus employed, etc.

It will be seen from FIG. 1 that the actual value of the variable damping control signal I, transmitted to the vibration damping apparatus, is preferably determined according to the following relationship:

$$I = I_0 - I_1 - I_2 \quad (7)$$

wherein $I_0$ is preferably a constant reference value, and wherein $I_1$ and $I_2$ preferably have values between 0.1 and 1.0 determined according to the relationships (4) and (6) set forth above. Also, preferably, the variable damping control signal is limited so as to be allowed to range only between the limits of about 0 and about $I_{max}$. Most preferably, the damping control signal I is an electrical current used to set the damping characteristics of variable damping vibration isolation apparatuses (or shock absorbers), the damping characteristics of which can be current controlled. In an embodiment wherein all or part of the above-described signals are derived via numerical computation by a microprocessor or the like, preferably, the final control signal I will be converted by means well known in the art, to a current having a relatively corresponding value. However, it will be appreciated that any other signal, digital or analog, such as a voltage signal, a binary numerical representation, etc. may be derived which reflects the relationships set forth above, and all such control signals are contemplated as being within the scope of the present invention.

As noted in relationship (7) set forth above, the final control signal I is, in part, derived by reducing the reference control signal $I_0$ by the intermediate signal $I_2$ as reflected in transformation (4). The reference control signal $I_0$ is preferably further reduced by the intermediate signal $I_1$ to derive the final control signal I. However, a test is first conducted to determine whether the reference signal $I_0$ is to be so further reduced by the intermediate signal $I_1$.

Figure 3:
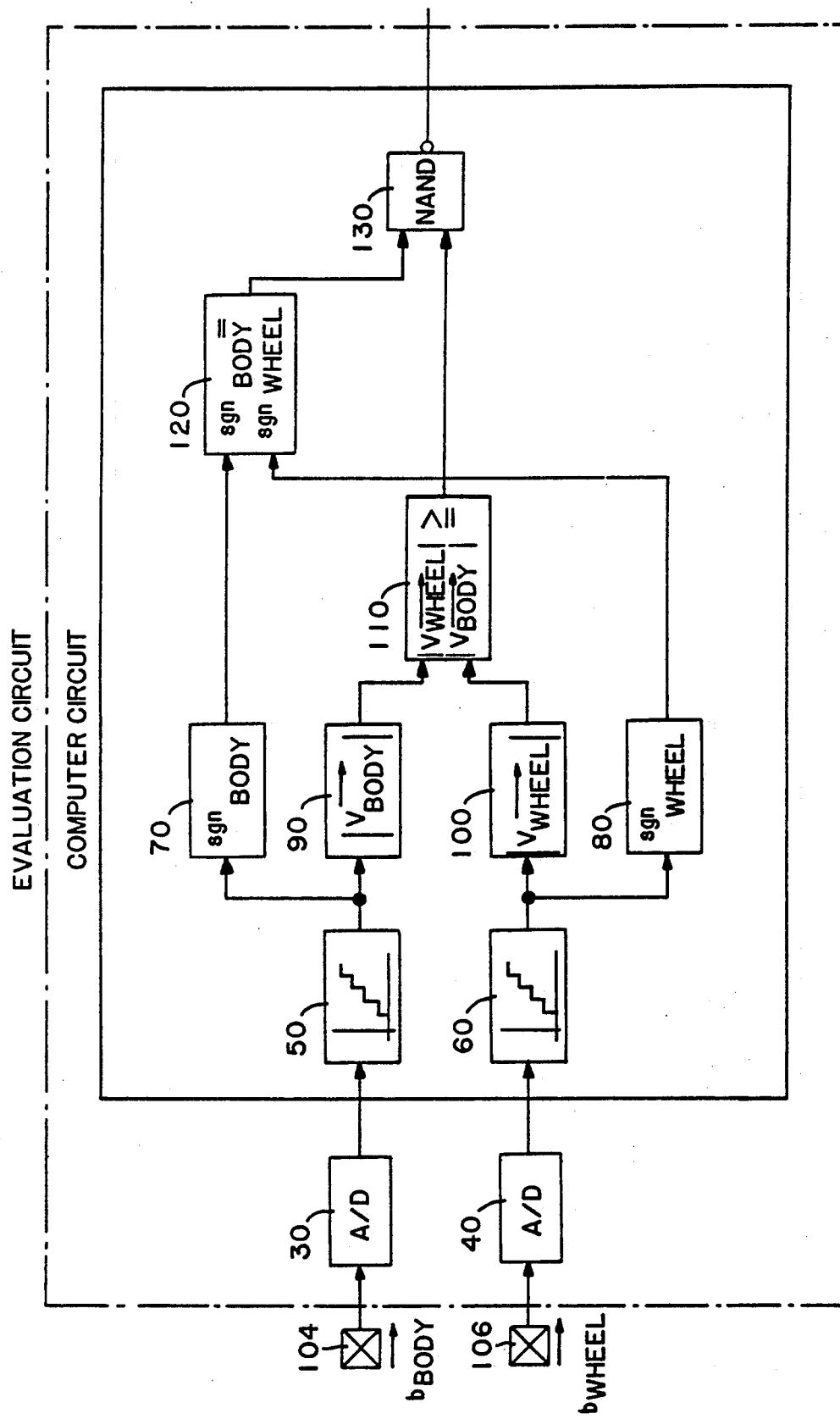
FIG. 3 illustrates an evaluation circuit for the processing of the velocity signals.

A preferred embodiment of such a test circuit or algorithm is more fully set forth in FIG. 3. However, and still referring to FIG. 1, it will be seen that, in brief, the actual vector values indicating both the direction and magnitude of the wheel acceleration and the body acceleration are employed in a test circuit (or algorithm), wherein the following two conditions (8) and (9) are checked:

$$|V_{wheel}| \geq |V_{body}|? ; and \quad (8)$$

$$E_{body} = E_{wheel}? \quad (9)$$

That is, tests are conducted to determine (a) whether the absolute value of the wheel velocity is equal to or exceeds the absolute value of the body velocity, and (b) whether the body and the wheel are both moving in the same direction. The values for the velocities of the wheel and body may be readily determined by integration of the acceleration signals, through means well known in the art, such as, for example, numerical integration via a microprocessor or analog integration through the familiar circuit of a resistor and an amplifier connected in series, with a feedback capacitor connected across the amplifier.

If both conditions (8) and (9) are met, then the intermediate signal $I_1$ is set to 0 and is not subtracted from the reference signal $I_0$ in determining the final damping control signal I. Since, in a preferred embodiment, the rigidity (or degree of stiffness) of the damping apparatus varies inversely with respect to the control signal I, satisfaction of both of relationships (8) and (9) and a corresponding setting of $I_1$ to 0 results in the setting of a relatively softer damping characteristic.

Figure 2:
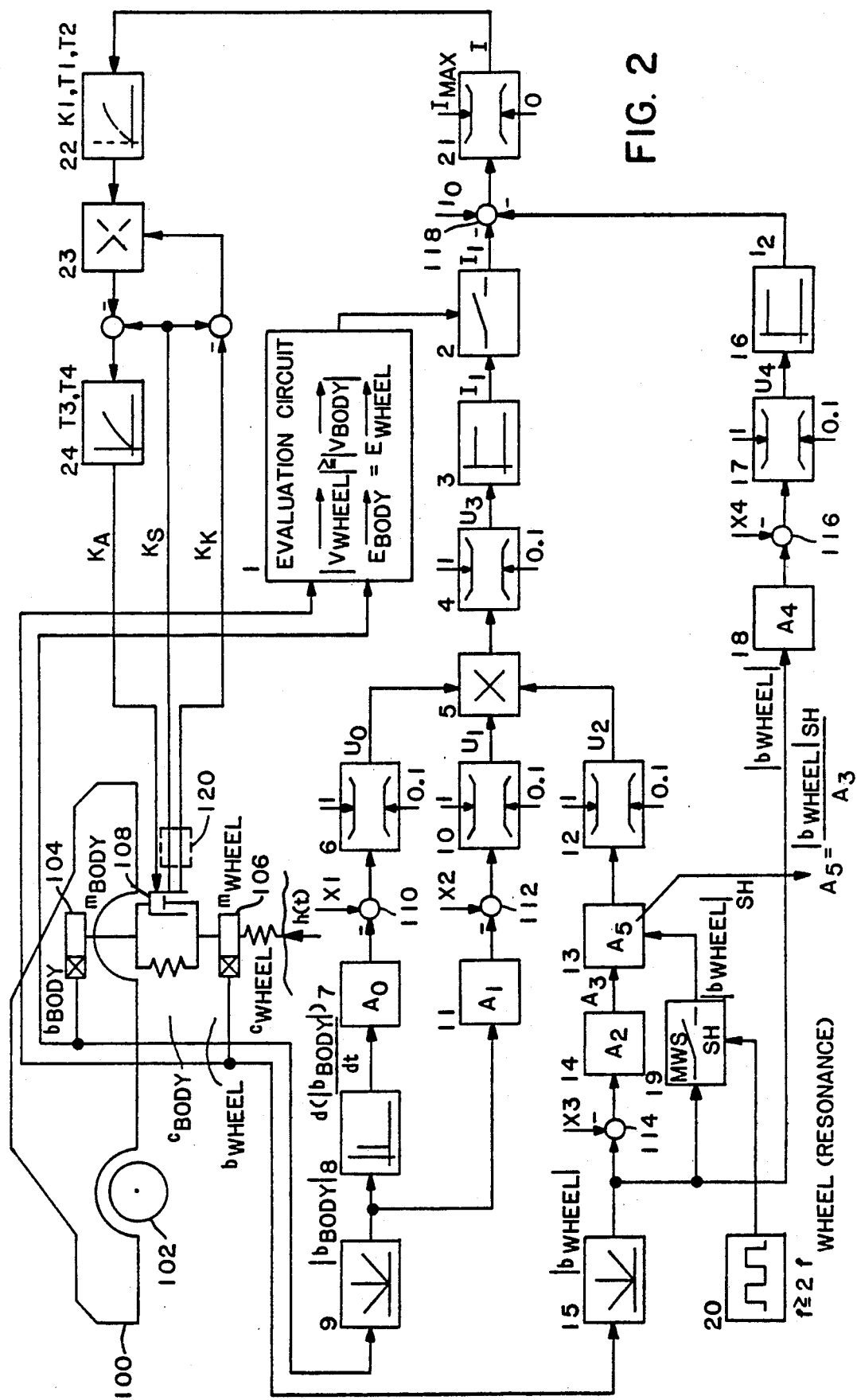
FIG. 2 illustrates an apparatus for the control of a two mass system, in a schematic manner.

FIG. 2 is another schematic depiction of a preferred embodiment of the invention, wherein the various processing of signals set forth in equations (1)–(9) above and illustrated algorithmically in FIG. 1 are preferably carried out, at least in part, using analog components and analog signals, such as, for example, current voltage, etc. Of course, it will be readily appreciated by one of ordinary skill in the art that the invention as embodied in FIG. 2 can be equally well carried out employing other equivalent technology, such as, for example, digital processing techniques.

A vehicle equipped with the present invention has a vehicle body 100 having a mass $m_{body}$ and a vehicle wheel 102 having a mass $m_{wheel}$. The interaction of the vehicle body and vehicle wheel with one another through a vibration damping apparatus having variable damping characteristics 108 is approached by considering the vehicle body to have a spring constant of $c_{body}$ and the wheel to have a spring constant of $c_{wheel}$. Two sensors (e.g., accelerometers) 104 and 106 generate vector acceleration signals $b_{body}$ and $b_{wheel}$ representative of both the direction and the magnitude of the accelerations of the body and wheel, respectively. Such acceleration signals are generated in response to the interaction of the vehicle body and wheel with an uneven road surface depicted generally as a function h(t). The vehicle body acceleration signal $b_{body}$ is processed according to equation (1) above to generate an intermediate signal $U_0$ via an absolute value generator 9, a differentiator 8, a coefficient multiplier 7, a summation (or subtraction) element 110 and a limiting circuit 6.

Substantially in parallel, an intermediate signal $U_1$ is generated via a coefficient multiplier 11, a summation (or subtraction) element 112 and another limiting circuit 10.

The wheel acceleration $b_{wheel}$ sensed by accelerometer 106 is processed according to equation (3) set forth above to produce the intermediate signal $U_2$ via an absolute value generator 15, a summation (or subtraction) element 114, a coefficient multiplier 14, a coefficient multiplier 13 and a still further limiting circuit 12. The coefficient $A_5$ employed in coefficient multiplier 13 is, in turn, derived according to equation (5) above as a function of the wheel acceleration produced by a sample and hold circuit 19, which is driven at a sampling frequency f which is at least equal to greater than twice the resonant frequency of the wheel $f_{wheel\ (resonance)}$. Sample and hold circuit 19 may preferably incorporate memory circuitry and comparitor circuitry for maintaining in memory the greatest wheel acceleration produced over an appropriately chosen period of time.

The three generated intermediate signals $U_0$, $U_1$ and $U_2$ are all multipled together in a multiplier element 5, and the resulting product is limited in limiting circuitry 4, such that, preferably, its value ranges between about 0.1 and about 1.0. The thus limited product signal, designated in FIG. 2 as $U_3$, is then introduced into a proportional current generating circuit 3. For example, intermediate signal $U_3$ could be a voltage representative signal, and current generating element 3 could be a voltage controlled current source, e.g., a transistor circuit well known in the art which generates a proportionately representative current signal $I_1$ in response thereto.

The absolute value of the wheel acceleration produced by absolute value generator 15 is also further processed, substantially in parallel, to produce a second intermediate current signal $I_2$, according to equation (4) above, via coefficient multiplier 18, summation (or subtraction) element 116, limiting circuitry 17 and an additional voltage controlled proportional current source 16.

A constant reference current $I_0$ is introduced into addition (or subtraction) element 118, wherein signal $I_2$ is subtracted from reference signal $I_0$ to partially produce the vibration damper control signal I.

In Evaluation Circuit 1, discussed more fully in connection with FIG. 3, the body and wheel accelerations are integrated to yield the body and wheel velocities $V_{body}$ and $V_{wheel}$, respectively, and testing is conducted to determine whether both of the following conditions are met: (a) whether the wheel velocity exceeds or at least equals the body velocity, and (b) whether the directions of the two velocities are identical. If both of these conditions are met, then the value of the intermediate signal $I_1$ is set to 0. In other words, in such a case, the constant reference signal $I_0$ is not further reduced by the value of the intermediate signal $I_1$. Otherwise, if both of the above conditions are not met, the value of the intermediate signal $I_1$ is set to its actual processed value, and the value of the constant reference signal $I_0$ is further reduced by this processed value $I_1$ in addition (or subtraction) element 118.

The value of the calculated control signal I is appropriately limited in a still further limitation circuit 21 between maximum and minimum values $I_{max}$ and 0, appropriately set according to the range of possible adjustment of the vibration damping apparatus being employed.

As noted above, preferably, the vibration damping apparatus 108 exhibits a variable damping characteristic, preferably in response to a variable control current signal I. One possible such variable damping apparatus is disclosed in U.S. Pat. No. 4,749,069, issued June 7, 1988 to Knecht, et al. and entitled "Vibration Damper for Motor Vehicles having an Arrangement for Varying Damping Thereof", which issued U.S. patent is hereby expressly incorporated by reference, with the same effect as if the entire contents thereof were expressly set forth herein.

Even more preferably, the vibration damping apparatus 108 will have a damping characteristic which is variable between a relatively stiff damping characteristic $K_S$ and a relatively soft damping characteristic $K_K$. Additionally, in an even more preferred embodiment, the vibration damping apparatus 108 includes means for setting, either manually or otherwise, the damping characteristic limits $K_S$ and $K_K$. Still further, in a particularly preferred embodiment, the vibration damping apparatus 108 includes circuitry (e.g., limit indicators and a potentiometer) 120 which generates signals representative of the currently set damping characteristic limits $K_S$ and $K_K$.

The damping force characteristic $K_A$ actually applied by vibration damping apparatus 108 is, therefore, in general, a function of $K_S$, $K_K$ and I. Moreover, the damping force characteristics need not be absolutely linear functions, but may be nonlinear and may vary additionally with respect to time, etc. In general, the actual applied damping force characteristic $K_A$ will be a member of the general family of characteristics represented as:

$$K_A = K_S - (K_S - K_K) \times K_1 \times I$$

In FIG. 2, this general family of damping characteristics is schematically represented by a proportional conversion element 22, which includes time delay means dependent upon T1 and T2, multiplication circuitry 23 and a proportional conversion element 24, incorporating time delay means dependent upon T3 and T4.

Dependent upon the control current I, the damping characteristic limit signals $K_S$ and $K_K$ provided by limit indication means 120, and appropriately determined parameters K1, T1, T2, T3, and T4, the damping characteristics of vibration damping apparatus 108 are, therefore, appropriately set between the applicable limits.

Referring now to FIG. 3, preferably, Evaluation Circuit 1 of FIG. 2 includes a computer circuit (e.g., a commercially available microprocessor), appropriately programmed to perform the functions schematically and algorithmically depicted in FIGS. 1 and 2.

The acceleration vector signals produced by sensors 104 and 106 are digitized in A/D converters 30 and 40, and the outputs thereof are integrated in integrators 50 and 60, respectively, to determine the corresponding vector velocities. The directions and magnitudes of these velocities are separated in elements 70, 80, 90 and 100, and in comparator 110, it is determined whether the absolute value of the wheel velocity equals or exceeds the absolute value of the body velocity, while, in element 120, it is determined whether the vehicle body and wheel are both moving in the same direction, i.e., up or down. The logical outputs of elements 110 and 120 are then introduced into a NAND gate 130, the output of which is fed to the switching element 2 shown in FIG. 2.

Referring again to FIG. 2, there, the wheel suspension of a vehicle wheel of a vehicle is simulated by means of a two mass system. The weight of the vehicle body is represented by $m_{body}$, the wheel mass by $m_{wheel}$, the spring constant of the vehicle body by $c_{body}$ and the spring constant of the vehicle wheel by $c_{wheel}$. The unevenness of the road is designated h(t). The vibration damper is described by the damping force constant $K_A$, which is, in turn, influenced by the valve control current I.

In the Evaluation Circuit 1, a switching criterion is derived to activate the analog circuit 2. The vehicle always runs on the lowest damping force characteristic, if the following conditions are fulfilled: (1) the velocity of the wheel is greater than the velocity of the vehicle body, and (2) the direction of the unit vectors of the wheel and of the body are identical. For this purpose, the wheel acceleration and the vehicle body acceleration are determined by sensors, and processed by the Evaluation Circuit 1, shown in greater detail in FIG. 3. In practice, to fulfill these conditions, a critical value circuit and a hysteresis (or memory circuit) may be permitted. If the criterion is fulfilled, switch circuit 2 is opened, such that the current $I_1$ equals zero, and the valve current is determined only by the current $I_0$ and by the current $I_2$.

If the switching criterion is not fulfilled, the damping force is continuously set by the control circuit $I_1$. This control circuit $I_1$ is formed by the multiplication of the voltages $U_0$, $U_1$ and $U_2$ in the multiplier 5 and the voltage current transformation in the proportional element 3. For example, a voltage controlled current source, such as a transistor circuit, well known in the art, could be utilized for proportional element 3. The limiters 4, 6, 10, 12 and 17 limit the output voltages to within a defined range. For example, this range in FIG. 1 is shown normalized to between 0.1 and 1. $U_0$ is calculated from the absolute value of the vehicle body acceleration 9, the differentiator 8, the coefficient multiplier 11 and the constant $X_1$. $U_1$ is calculated from the absolute value of the vehicle body acceleration 9, the coefficient multiplier 7 and the constant $X_2$.

The influence of the roadway is taken into consideration by the vehicle wheel acceleration in the coefficient divider 13, the coefficient multiplier 14, the constant $X_3$, the absolute value generation of the vehicle wheel acceleration 15, the maximum value memory 19 and the frequency generator 20.

Since the damping force characteristics do not as a rule follow a linear path, there are different comfort actions for different roadway profiles. This influence can be corrected by means of the coefficient divider 13, the maximum value memory 19 and the frequency generator 20. In the additional sample and hold circuit 19, the maximum wheel acceleration for the half-period of the wheel resonant frequency is buffered, and transmitted to the coefficient divider 13 to correct the control voltage $U_2$.

The safety of the vehicle is determined, among other things, by the dynamic wheel load fluctuations. Severe wheel accelerations caused by the roadway also increase the wheel load fluctuations. In the proportional element 16, from the limiter 17, the constant $X_4$, and the coefficient multiplier 18 and the absolute value of the vehicle wheel acceleration 15, therefore, a control current $I_2$ is calculated, which continuously increases the damping force with increasing wheel acceleration.

For the realization of the control apparatus, an adjustment valve is necessary, which produces a proportional action between the hardest damping force characteristic $K_S$ and the minimum valve current, e.g. I=0, and the softest damping force characteristic $K_K$ and the maximum valve current $I_{max}$. The damping force characteristics need not be linear. For example, the damping force constant $K_A$ for any random point in the family of characteristics can be calculated from:

$$K_A = K_S - (K_S - K_K) \times K_1 \times I.$$

The damping force constant of the vehicle body $K_A$ is proportional to the control current I, whose amplitude can be limited in the limiter 21 to a desired range, e.g., between about 0 and about $I_{max}$. The regulation of the adjustment valve is described in the proportional element with a delay 22 by $K_1$, $T_1$ and $T_2$. The temporal action of a vibration damper is taken into consideration in an additional proportional element with delay 24 by $T_3$ and $T_4$.

FIG. 3 illustrates the processing of the velocity signals $V_{body}$ and $V_{wheel}$ from the measured acceleration signals $b_{body}$ and $b_{wheel}$. The analog signals are digitized by means of the high-speed A/D converters 30 and 40, and then further processed in a computer (e.g. a microcomputer). After integration of the digital signals in the integrators 50 and 60, the mathematical signs (i.e. the direction of the unit vectors E) are evaluated, each in a vectorizer 70 and 80. In the comparator 120, the output signal now becomes logical "high", if both mathematical signs are the same. The absolute value of the velocities is calculated in the absolute value generation 90 and 100, and compared in the comparator 110. A critical value and hysteresis can be programmed. The output signal from the comparator 110 is only logical "high" if the comparison is true. The output signal of the NAND function 130 activates the analog switch 2, as shown in FIG. 2.

In summing up, an embodiment of invention resides in a apparatus for the computer-assisted control, as a function of the roadway, of vibration dampers of a vehicle suspension system, with sensors attached to the vehicle and/or to vibration dampers which emit electrical signals which characterize the unevenness of the roadway, with an evaluation circuit (computer) which receives the sensor signals and produces from them the actuating signals for the vibration dampers, which exhibit a wide spread of the family of characteristics between a very low damping force and a very high damping force. The Evaluation Circuit 1 converts the sensor signals $b_{body}$ and $b_{wheel}$ into signals and transmits them to an analog circuit 2 receiving the absolute generation 9 of the car body acceleration and the absolute generation 15 of the car wheel acceleration, whereby the summing point forms, from the current $I_1$ of the absolute generations (9 and 15) of the car body acceleration and the car wheel acceleration, the current $I_2$ of an absolute value generation 15 of the car wheel acceleration, and a constant current $I_0$, an activating signal for a proportional valve and/or an "n"-number of digital valves of the vibration damper, such that the lowest damping force characteristic is engaged when the velocity of the wheel $V_{wheel}$ is greater than the velocity of the car body $V_{body}$ and the direction of the unit vector $E_{wheel}$ of the wheel is the same as the direction of the unit vector $E_{body}$ of the car body.

Another aspect of the invention resides in the fact that the proportional valve has a proportional action between a high damping force characteristic $K_{Sport}$ at a low current $I_{min}$, and low damping force characteristic $K_{Comfort}$ at a high current $I_{max}$.

Yet another aspect of the invention resides in the fact that the sensor signals $b_{body}$ and $b_{wheel}$, after digitization in an A/D converter 30, 40, are then integrated in the Evaluation Circuit 1 into an integral 50, 60 and the mathematical signs are evaluated in a vectorizer 70, 80 and transmitted to a comparator 120, whereby, in absolute value generators 90, 100, the appropriate amount of the velocity V is calculated, and compared in the comparator 110, so that, with the same mathematical signs of the unit vectors E in the comparator 120 and a true comparison of velocities V in the comparator 110, the output signals of the comparator 120 and the comparator 110 are logical "high", and in the NAND function 130, produce an output signal to activate the analog circuit 2.

The invention as described hereinabove in the context of a preferred embodiment is not to be taken as limited to all of the provided details thereof, since modifications and variations thereof may be made without departing from the spirit and scope of the invention.

What is claimed is:

1. A suspension system for a vehicle, said vehicle including a vehicle body and a vehicle wheel, said suspension system comprising:

adjustable vibrational damping means for applying a vibrational damping action between said vehicle body and said vehicle wheel and for varying at least one characteristic of said applied vibrational damping action in response to a vibrational damping control signal;

vehicle body accelerometer means for sensing an acceleration representative of the vehicle body and for generating at least one signal representative thereof;

vehicle wheel accelerometer means for sensing an acceleration representative of the vehicle wheel and for generating at least one signal representative thereof;

signal processing means for processing said at least one signal representative of said vehicle body acceleration and said at least one signal representative of said vehicle wheel acceleration and for generating therefrom said vibrational damping control signal;

said signal processing means comprising means for determining the velocity and direction of travel of said vehicle wheel based on said vehicle wheel acceleration; means for determining the velocity and direction of travel of said vehicle body based on said vehicle body acceleration; testing means for testing if the following two conditions are fulfilled:

$|V_{wheel}| \geq |V_{body}|?$; and (a)

$E_{body} = E_{wheel}?$; (b)

$|V_{wheel}|$ and $|V_{body}|$ being the absolute values representative of the velocities of said vehicle wheel and said vehicle body, respectively, and $E_{body}$ and $E_{wheel}$ signals representative of the direction of travel of said vehicle body and said vehicle wheel, respectively;

and means for generating said vibration damping control signal based on the results of the test.

2. The suspension system for a vehicle according to claim 1, wherein said signal processing means comprises differentiating means for generating a differentiation signal representative of the rate of change with respect to time of at least one of said at least one signal representative of said vehicle body acceleration and said at least one signal representative of said vehicle wheel acceleration.

3. The suspension system for a vehicle according to claim 1, wherein said at least one vehicle body acceleration signal and said at least one vehicle wheel acceleration signal are both vector signals which represent both magnitude and direction, and wherein said signal processing means further comprises absolute value generation means for generating a signal representative of the absolute value of said representative vector vehicle body acceleration signal and for generating a signal representative of the absolute value of said representative vector vehicle wheel acceleration signal.

4. The suspension system for a vehicle according to claim 2, wherein said vehicle body acceleration signal and said vehicle wheel acceleration signal are both vector signals which represent both magnitude and direction, and wherein said signal processing means further comprises absolute value generation means for generating a signal representative of the absolute value of said representative vector vehicle body acceleration signal and for generating a signal representative of the absolute value of said representative vector vehicle wheel acceleration signal.

5. The suspension system according to claim 4, wherein said signal processing means still further comprises means for generating a signal $I_1$ proportional to a product of at least three intermediate signals $U_0$, $U_1$ and $U_2$ which are representative of the absolute values of said differentiation signal, said vehicle body acceleration and said wheel acceleration, respectively.

6. The suspension system according to claim 5, wherein said signal processing means additionally comprises means for altering said vibrational damping control signal by an amount corresponding to said proportional signal $I_1$, if either of said conditions (a) and (b) is negative.

7. The suspension system according to claim 6, wherein said signal processing means still further comprises means for generating a signal $I_2$ indicative of said absolute value of said wheel acceleration and means for altering said vibrational damping control signal by an amount corresponding to said indicative signal $I_2$.

8. The suspension system according to claim 1, wherein said at least one characteristic of said applied vibrational damping action which is varied in response to said vibrational damping control signal comprises at least a relatively high damping force characteristic $K_{Sport}$ and a relatively low damping force characteristic $K_{Comfort}$.

9. A suspension system for a vehicle, said vehicle including a vehicle body and a vehicle wheel, said suspension system comprising:
- adjustable vibrational damping means for applying a vibrational damping action between said vehicle body and said vehicle wheel and for varying at least one characteristic of said applied vibrational damping action in response to a vibrational damping control signal;
- vehicle body accelerometer means for sensing an acceleration representative of the vehicle body and for generating at least one signal representative thereof;
- vehicle wheel accelerometer means for sensing an acceleration representative of the vehicle wheel and for generating at least one signal representative thereof;
- signal processing means for processing said at least one signal representative of said vehicle body acceleration and said at least one signal representative of said vehicle wheel acceleration and for generating therefrom said vibrational damping control signal;
- said signal processing means comprising differentiating means for generating a differentiation signal representative of the rate of change with respect to time of at least one of said at least one signal representative of said vehicle body acceleration and said at least one signal representative of said vehicle wheel acceleration;
- said signal processing means still further comprising means for generating a signal $I_1$ proportional to a product of at least three intermediate signals $U_0$, $U_1$ and $U_2$ which are representative of the absolute values of said differentiation signal, said vehicle body acceleration and said wheel acceleration, respectively;
- said signal processing means still further comprising means for generating a signal $I_2$ indicative of said absolute value of said wheel acceleration and means for altering said vibrational damping control signal by an amount corresponding to said indicative signal $I_2$; and
- wherein said signal processing means additionally comprises means for generating a reference signal $I_0$, and for producing said vibrational damping control signal by altering said reference signal $I_0$ by amounts corresponding to said proportional signal $I_1$ and to said indicative signal $I_2$.

10. A suspension system for a vehicle, said vehicle including a vehicle body and a vehicle wheel, said suspension system comprising:
- adjustable vibrational damping means for applying a vibrational damping action between said vehicle body and said vehicle wheel and for varying at least one characteristic of said applied vibrational damping action in response to a vibrational damping control signal;
- vehicle body accelerometer means for sensing an acceleration representative of the vehicle body and for generating at least one signal representative thereof;
- vehicle wheel accelerometer means for sensing an acceleration representative of the vehicle wheel and for generating at least one signal representative thereof;
- signal processing means for processing said at least one signal representative of said vehicle body acceleration and said at least one signal representative of said vehicle wheel acceleration and for generating therefrom said vibrational damping control signal;
- said signal processing means comprising differentiating means for generating a differentiation signal representative of the rate of change with respect to time of at least one of said at least one signal representative of said vehicle body acceleration and said at least one signal representative of said vehicle wheel acceleration;
- said signal processing means further comprising means for determining the velocity and direction of travel of said vehicle wheel based on said vehicle wheel acceleration; means for determining the velocity and direction of travel of said vehicle body based on said vehicle body acceleration; testing means for testing if the following two conditions are fulfilled:

$$|V_{wheel}| \geq |V_{body}|?; \text{ and} \qquad (a)$$

$$E_{body} = E_{wheel}?; \qquad (b)$$

$|V_{wheel}|$ and $|V_{body}|$ being the absolute values representative of the velocities of said vehicle wheel and said vehicle body, respectively, and wherein $E_{body}$ and $E_{wheel}$ are the direction of travel of said vehicle body and said vehicle wheel, respectively;
- said signal processing means still further comprising means for generating a signal $I_1$ proportional to a product of at least three intermediate signals $U_0$, $U_1$ and $U_2$ which are representative of the absolute values of said differentiation signal, said vehicle body acceleration and said wheel acceleration, respectively;
- said signal processing means still further comprising means for generating a signal $I_2$ indicative of said absolute value of said wheel acceleration and means for altering said vibrational damping control signal by an amount corresponding to said indicative signal $I_2$; and
- wherein said signal processing means further comprises means for generating a reference signal $I_0$ such that:
- said reference signal $I_0$ is reduced by an amount corresponding to said indicative signal $I_2$ and;
- if, and only if, either of said conditions (a) and (b) is negative, said reference signal $I_0$ is further reduced by an amount corresponding to said proportional signal $I_1$.

11. The suspension system according to claim 10, wherein said signal processing means still further comprises scaling means for scaling at least one of said differentiation signal, said signal representative of the absolute value of said vehicle body acceleration and said signal representative of the absolute value of said vehicle wheel acceleration, said scaling means comprising means for subjecting said at least one signal to at least one of the following operations: addition to an empirically determined substantially constant signal; and multiplication by said empirically determined substantially constant signal.

12. The suspension signal according to claim 11, wherein said signal processing means additionally comprises limiting means for limiting at least one of said differentiation, vehicle wheel acceleration and vehicle body acceleration signals between upper and lower limits.

13. The suspension system according to claim 12, wherein said signal processing means still further comprises sampling means for sampling said signal representative of the absolute value of said vehicle wheel acceleration, said sampling means having a sampling rate equal to or exceeding a resonance frequency of the vehicle wheel.

14. The suspension system according to claim 13, wherein said sampling means additionally comprises comparator and memory circuitry for determining and maintaining a maximum sampled signal representative of the absolute value of said wheel acceleration.

15. The suspension system according to claim 14, wherein said signal processing means still further comprises means for altering said intermediate signal $U_2$ according to said maximum sampled signal.

* * * * *

UNITED STATES PATENT AND TRADEMARK OFFICE
CERTIFICATE OF CORRECTION

PATENT NO. : 4,989,148
DATED : January 29, 1991
INVENTOR(S) : Reinhard Gürke and Berthold Altwicker It is certified that error appears in the above-identified patent and that said Letters Patent is hereby corrected as shown below:

In column 4, line 53, delete:

$$U_1 = [X_2 - A_1 \mid b_{body} \uparrow ] \, 0.1^{1.0}$$

and insert:

$$U_1 = [X_2 - A_1 \mid b_{body} \mid ] \, {}^{1.0}_{0.1}$$

In column 5, line 4, delete:

$$U_2 = [A_2 \, A_5 \, ( \mid b_{wheel} \mid - X_3) ] \, 0.1^{1.0}$$

and insert:

$$U_2 = [A_2 \, A_5 \, ( \mid b_{wheel} \mid - X_3) ] \, {}^{1.0}_{0.1}$$

UNITED STATES PATENT AND TRADEMARK OFFICE
CERTIFICATE OF CORRECTION

PATENT NO. : 4,989,148

DATED : January 29, 1991

INVENTOR(S) : Reinhard Gürke and Berthold Altwicker

It is certified that error appears in the above-identified patent and that said Letters Patent is hereby corrected as shown below:

In column 5, line 6, delete:

$$I_2 \alpha [ A_4 | b_{wheel} | - X_4 ] 0.1^{1.0}$$

and insert:

$$I_2 \cdot [ A_4 | b_{wheel} | - X_4 ] \begin{matrix} 1.0 \\ 0.1 \end{matrix}$$

In column 5, line 35, delete:

$$I_1 \quad [ U_0 \; U_1 \; U_2 ] \; 0.1^{1.0}$$

and insert:

$$I_1 \quad [ U_0 \; U_1 \; U_2 ] \begin{matrix} 1.0 \\ 0.1 \end{matrix}$$

UNITED STATES PATENT AND TRADEMARK OFFICE
CERTIFICATE OF CORRECTION

PATENT NO. : 4,989,148
DATED : January 29, 1991
INVENTOR(S) : Reinhard Gürke and Berthold Altwicker It is certified that error appears in the above-identified patent and that said Letters Patent is hereby corrected as shown below:

In Claim 1, line 31, delete:

$$|V_{wheel}| \geq |V_{body}| \,?\text{: and}$$

and insert:

$$|V_{wheel}| \geq |V_{body}| \,?\text{; and}$$

In Claim 1, line 37, after '$E_{wheel}$', insert --are--.

In Claim 1, line 37, after '$E_{wheel}$', delete "signals representative of".

Signed and Sealed this

Eleventh Day of August, 1992

*Attest:*

DOUGLAS B. COMER

*Attesting Officer*     *Acting Commissioner of Patents and Trademarks*